United States Patent
T

(10) Patent No.: US 7,310,324 B2
(45) Date of Patent: Dec. 18, 2007

(54) TECHNIQUE FOR REDUCING PROCESSING POWER IN 3G SYSTEMS

(75) Inventor: Kiran T, Basaveshwarnagar (IN)

(73) Assignee: Sasken Communication Technologies Limited, Bangalore (IN)

( * ) Notice: Subject to any disclaimer, the term of this patent is extended or adjusted under 35 U.S.C. 154(b) by 1034 days.

(21) Appl. No.: 10/374,889

(22) Filed: Feb. 25, 2003

(65) Prior Publication Data

US 2003/0223467 A1 Dec. 4, 2003

Related U.S. Application Data

(63) Continuation of application No. PCT/IB01/01515, filed on Aug. 21, 2001.

(60) Provisional application No. 60/227,813, filed on Aug. 25, 2000.

(51) Int. Cl.
*H04B 7/216* (2006.01)
(52) U.S. Cl. ........................................ 370/335; 370/464
(58) Field of Classification Search ...................... None
See application file for complete search history.

(56) References Cited

U.S. PATENT DOCUMENTS

| | | | |
|---|---|---|---|
| 5,483,550 A | | 1/1996 | Hulbert ...................... 375/202 |
| 6,624,767 B1 * | | 9/2003 | Shiu et al. .................... 341/81 |
| 6,788,657 B1 * | | 9/2004 | Freiberg et al. ............. 370/328 |
| 6,904,077 B2 * | | 6/2005 | Toskala et al. ............. 375/130 |

OTHER PUBLICATIONS

3GPP TS 25.212 V3.4.0, pp. 1-62, Sep. 2000.*
"Technical Specification Group Radio Access Network Multiplexing and Channel Coding (FDD)", *3rd Generation Partnership Project (3GPP)*;, (3G TS 25.212 Version 3.0.0),(Oct. 1999), 54.
"Complexity Analysis of the Motorola Turbo Code Interleaver", *Motorola, TSG-RAN Working Group I Meeting #3*, 3GPP/TSGR. 1#3(99)-299, Eskilstuna, Sweden,(Mar. 22, 1999),1-5.

\* cited by examiner

*Primary Examiner*—Frank Duong
(74) *Attorney, Agent, or Firm*—Schwegman, Lundberg & Woessner P.A.

(57) ABSTRACT

The present invention provides an improved transmitter for processing data blocks including bits of data coming from multiple transport channels in a transmitter of a radio communication system supporting variable data-rate transmissions. This is accomplished by using a computationally efficient technique for processing the received data blocks for variable data rate transmissions. The improved transmitter receives the data blocks including the bits of data from multiple transport channels. The transmitter then forms rectangular arrays including a predetermined number of columns and rows using the received bits of data such that the columns are based on a segmented radio frame size suitable for variable data-rate transmission. The transmitter then equalizes and interleaves the formed columns and reads out bits of data in the equalized and interleaved columns column-by-column. The transmitter then multiplexes the read-out bits of data for variable data-rate transmissions.

36 Claims, 7 Drawing Sheets

TECHNIQUE FOR REDUCING PROCESSING POWER IN 3G SYSTEMS

This application is a continuation under 35 U.S.C. 111(a) of International Patent Application No. PCT/IB01/01515, filed Aug. 21, 2001, which claims priority to U.S. Provisional Patent Application Ser. No. 60/227,813, filed Aug. 25, 2000, all of which are incorporated herein by reference.

FIELD OF THE INVENTION

This invention generally relates to the physical layer of 3GPP compliant 3G base stations and mobile handsets, and more particularly to a technique for reducing required processing power by combining radio frame equalization, interleaving, and frame segmentation blocks in 3GPP compliant 3G base stations.

BACKGROUND

As radio communication becomes more widely accepted it will be desirable to provide various types of radio communication services to meet consumer demand. For example, support for facsimile, e-mail, video, Internet access, etc., via radio communication systems are envisioned. Moreover it is expected that users may wish to access different types of services at the same time. For example, a videoconference between two users would involve both speech and video support. Some of these different services will require relatively high data-rates compared with speech service that has been conventionally supplied by radio communication systems, while other services will require variable data-rate service. Thus, it is anticipated that future radio communication systems will need to be able to support high data-rate communications as well as variable data-rate communications. Currently 3G wireless systems support such a variety of applications that need different Quality of Service (QoS). The Direct Sequence Code Division Multiple Access (D)S-CDMA) based 3G system has greater flexibility in offering variable data-rates (up to 2 Mbps), which is particularly important for multimedia and Internet services. Different coding and interleaving schemes are employed in a physical layer to meet the required QoS. Because of different coding and interleaving schemes, 3G systems are generally very complex and hence need significant processing power. Interleaving is a system of error control coding whereby adjacent bits are transmitted in different hops and also comprise a forward error correction coding arrangement.

Therefore, there is a need in the art for reducing complexity in coding and interleaving schemes in the physical layer and for reducing processing power requirements without degradation in performance in 3G wireless systems.

SUMMARY OF THE INVENTION

The present invention provides an improved transmitter for processing data blocks including bits of data coming from multiple transport channels in a transmitter of a radio communication system supporting variable data-rate transmissions. In one example embodiment, this is accomplished by using a computationally efficient technique for processing the received data blocks for variable data rate transmissions. The improved transmitter receives the data blocks including the bits of data from multiple transport channels. The transmitter then forms rectangular arrays including a predetermined number of columns and rows using the received bits of data such that the columns are based on a segmented radio frame size suitable for variable data-rate transmission. The transmitter then interleaves the formed columns and further equalizes the columns by filling bits in unfilled elements of formed arrays and reads out column-by-column bits of data to reduce complexity in coding and interleaving schemes in the physical layer. The reduced complexity in coding and interleaving schemes further results in reducing processing power requirements without degradation in performance in 3G wireless systems. The transmitter then multiplexes the read-out bits of data for variable data-rate transmissions.

Another aspect of the present invention is a method for processing data blocks including bits of data coming from multiple transport channels in a transmitter of a radio communication system supporting variable data-rate transmissions. The method is performed by receiving the data blocks including the bits of data associated with each of the multiple transport channels. Then, rectangular arrays including a predetermined number of columns and arrays for each of the received data blocks are formed by filling elements in the formed arrays with the bits of data associated with each of the data blocks. Then, the columns in each of the formed arrays are equalized by adding filler bits to unfilled elements in the arrays. Then, inter-column permutation are performed for each of the formed arrays based on a look up table, and reading-out bits of data from each of the equalized columns in the arrays column-by-column.

Another aspect of the present invention is a computer readable medium having computer-executable instructions for processing data blocks including bits of data coming from multiple transport channels in a transmitter of a radio communication system supporting variable data-rate transmissions. According to the method, data blocks including the bits of data associated with each of the multiple transport channels are received and retangular arrays including a predetermined number of columns and arrays are formed for each of the received data blocks by filling elements in the formed arrays with the bits of data associated with each of the data blocks. Then, the columns in each of the arrays are equalized by adding filler bits to unfilled elements in the arrays. Then, inter-column permutation are performed for each of the formed arrays based on a look up table, and reading-out bits of data from each of the equalized columns in the arrays column-by-column.

Another aspect of the present invention is a computer system for processing data blocks including bits of data coming from multiple transport channels in a transmitter of a radio communication system supporting variable data-rate transmissions. The computer system comprises a storage device, an output device, and a processor programmed to repeatedly perform a method. According to the method, data blocks including the bits of data associated with each of the multiple transport channels are received and rectangular arrays including a predetermined number of columns and arrays are formed for each of the received data blocks by filling elements in the formed arrays with the bits of data associated with each of the data blocks. Then, the columns in each of the arrays are equalized by adding filler bits to unfilled elements in the arrays. Then, inter-column permutations are performed for each of the formed arrays based on a look up table, and reading-out bits of data from each of the equalized columns in the arrays column-by-column.

Other aspects of the invention will be apparent on reading the following detailed description of the invention and viewing the drawings that form a part thereof.

DETAILED DESCRIPTION

The present invention provides a technique for reducing complexity in coding and interleaving schemes in the physical layer and processing power requirements without degradation in performance in 3G wireless systems. This is accomplished by providing computationally efficient processing techniques.

Figure 1:
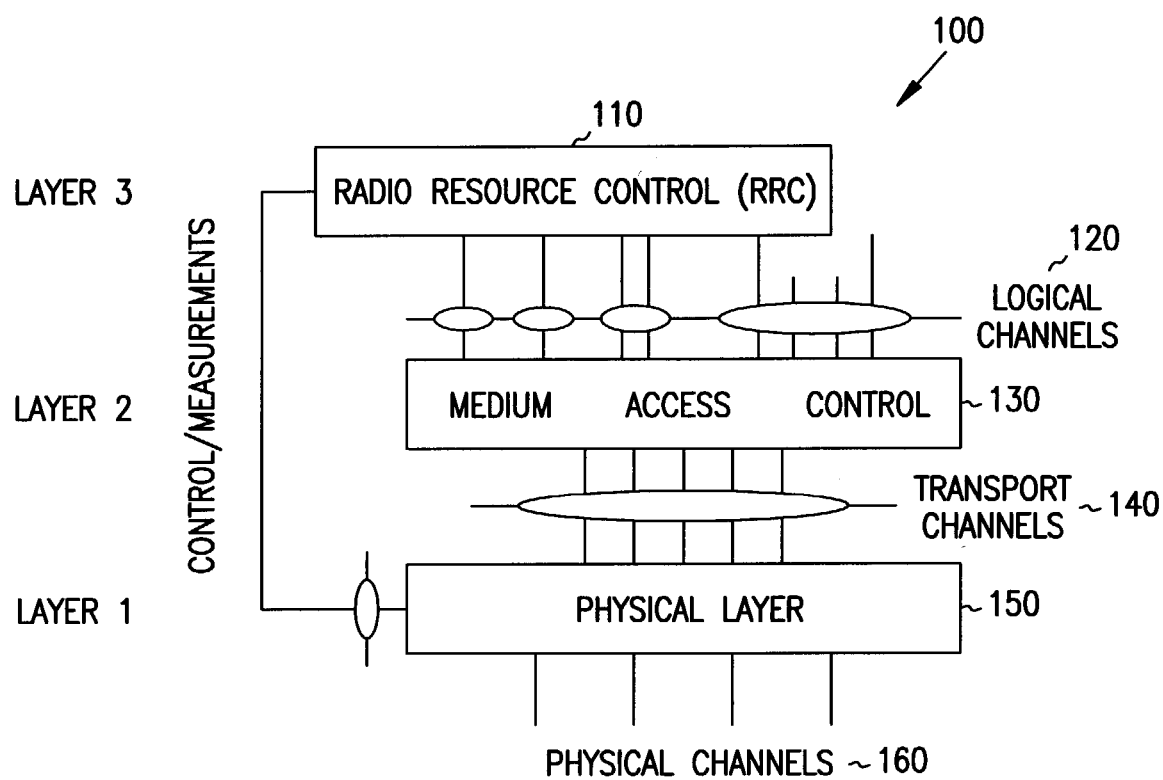
FIG. 1 is a block diagram of a prior art Third Generation Partnership Project (3GPP) radio interface protocol architecture.

FIG. 1 shows a prior-art 3GPP radio interface protocol architecture 100 including major components and their interconnections. Generally FIG. 1 shows how physical layer 150 is interconnected to Medium Access Control (MAC) 130 and Radio Resource Control (RRC) 10. Also shown in FIG. 1 are logical channels 120, sport channels 140, and physical channels 160 and their interconnections to the physical layer 150, MAC 130, and RRC 110. The basic protocol architecture 100 shown in FIG. 1 is the same for both the mobile side and the network side. The RRC 110, MAC 130, and the Physical layer 150 are also referred to as Layer 3 (L3), Layer (L2), and Layer 1 (L1), respectively. RRC 110 controls the behavior of the physical layer 150 by defining the operation of the logical and transport channels. During operation RRC 110 talks to MAC 130 through the logical channels 120, and the MAC 130 talks to physical layer 150 trough the transport channels 140. The basic unit exchanged between MAC 130 and the Physical Layer 150 is a 'Transport Block' (TB). When more than one transport block is exchanged between MAC 130 and physical layer 150 at the same time using the transport channels 140, then it is called a 'Transport Block Set' (TBS). Transport Block Size is defined as the number of bits in a TB. Transport Block Size is always fixed within a given TBS, that is, all TBs within a TBS are equally sized.

Generally, transport channels 140 such as broadcast channels are configured based on type of services, for example telephone calls, or browsing the Internet, etc., that the protocol architecture 100 is accessing. During operation, if a phone call is made RRC 110 will configure a dedicated channel and MAC 130 will talk to physical layer 150 through this dedicated channel.

Each of the transport channels 140 will have a Transport Format. This is generally the format offered by Physical Layer 150 to the MAC 130 (and vice versa) for the delivery of a TBS during a Transmission Time Interval (CI on a Transport Channel. TF is basically a structure for each of the transport channels 140 offered by the RRC 110. TF is like a packet containing information on what type of operation can be performed on which channel. Before a transport channel is configured, the TF information will be sent by the RRC 110 to the physical layer 150. Therefore, the physical layer 150 will know ahead of time what operation can be performed for which channel. TF is specific to one transport channel.

TTI is defined as the inter-arrival time of TBSs, and is equal to the periodicity at which a TBS is transferred by the physical layer 150 on the radio interface. It is always a multiple of the minimum interleaving period (for example 10, 20, 40, and 80 milliseconds as the length of one Radio Frame). MAC 130 delivers one TBS to the physical layer 150 every TTI. The TF contains two parts, one being the dynamic part and the other being the semi-static part. RRC 110 configures each of the transport channels to receive data from MAC 130 at a MTI of 10, 20, 40, or 80 milliseconds. Each transport channel can have its own TTI. Physical channel 150 receives data from each of the transport channels 140 every 10 milliseconds (one frame).

Attributes of the dynamic part are:
Transport Block Size
Transport Block Set Size (TBSS). TBSS is defined as the number of bits in a TBS.
Attributes of the semi-static part are:
TTI (10, 20, 40, or 80 milliseconds)
Error protection scheme to apply
Type of error protection (turbo code, convolution code or no channel coding)
Coding rate (½ or ⅓)
Static rate matching parameter
Puncturing limit (FDD: for uplink only)
Size of Cycle Redundancy Check (CRC) (0, 8, 12, 16, or 24 bits).

For example the dynamic part can include [320 bits, 640 bits] which are TBSize and TBSS, respectively. The semi-static part can include [10 milliseconds, convolution coding only, static rate matching parameter=1, 16 bits] which are TTI, Type of Error protection, and bit size of CRC, respectively.

Physical layer 150 multiplexes one or several transport channels 140, and for each transport channel, there exists a list of transport formats (a Transport Format Set) which are applicable. Nevertheless, at a given point of time, not all combinations may be submitted to physical layer 150 but only a subset, which is referred to as Transport Format Combinations (TFC). This is defined as an authorized combination of the currently valid TFs that can be submitted simultaneously to the physical layer 150 for transmission on a Coded Composite Transport Channel.

For example:

|  | Dynamic part | Semi-static part |
|---|---|---|
| DCH1: | [20 bits, 20 bits] | [10 ms, Convolution coding, Static rate matching parameter = 3] |
| DCH2: | [320 bits, 1280 bits] | [10 ms, Convolution coding, Static rate matching parameter = 3] |
| DCH3: | [320 bits, 320 bits] | [40 ms. Turbo coding, static rate matching parameter = 2] |

Transport Format Combination Set (TFCS) is defined as a set of TFCs on a Coded Composite Transport Channel.
For Example:

Dynamic Part:
Combination 1: DCH1: [20 bits, 20 bits], DCH2: [320 bits, 1280 bits], DCH3: [320 bits, 320 bits]
Combination 2: DCH1: [40 bits, 40 bits], DCH2: [320 bits, 1280 bits], DCH3: [320 bits, 320 bits]
Combination 3: DCH1 [160 bits, 160 bits], DCH2: [320 bits, 320 bits], DCH3: [320 bits, 320 bits]

Semi-static part:
   DCH 1: [10 ms,, convolutional coding only, static rate matching parameter=1]
   DCH 2: [10 ms, convolutional coding only, static rate matching parameter=1]
   DCH 3: [40 ms, Turbo coding, static rate matching parameter=2]

Note that the TFCS need not contain all possible TFCs that can be formed by TFSs of the corresponding TCs. It is only the combinations allowed by the RRC 110 that are included. Thereby a maximum total bit rate of all transport channels of a Code Composite Transport channel can be set appropriately. The Transport Format Indicator (TFI) is an index for a specific transport format within a TFS. It is used in the inter-layer communication between the MAC 130 and L1 150 each time a transport block set is exchanged between the two layers on a transport channel. Transport Format Combination Indicator (TFCI) is a representation of the current TFC. There is a one-to-one correspondence between a certain value of the TFCI and a certain TFC. The TFCI is used in order to inform the receiving side of the currently valid TFC, and hence how to decode, de-multiplex, and deliver the received data on the appropriate transport channels 140.

Figure 2:
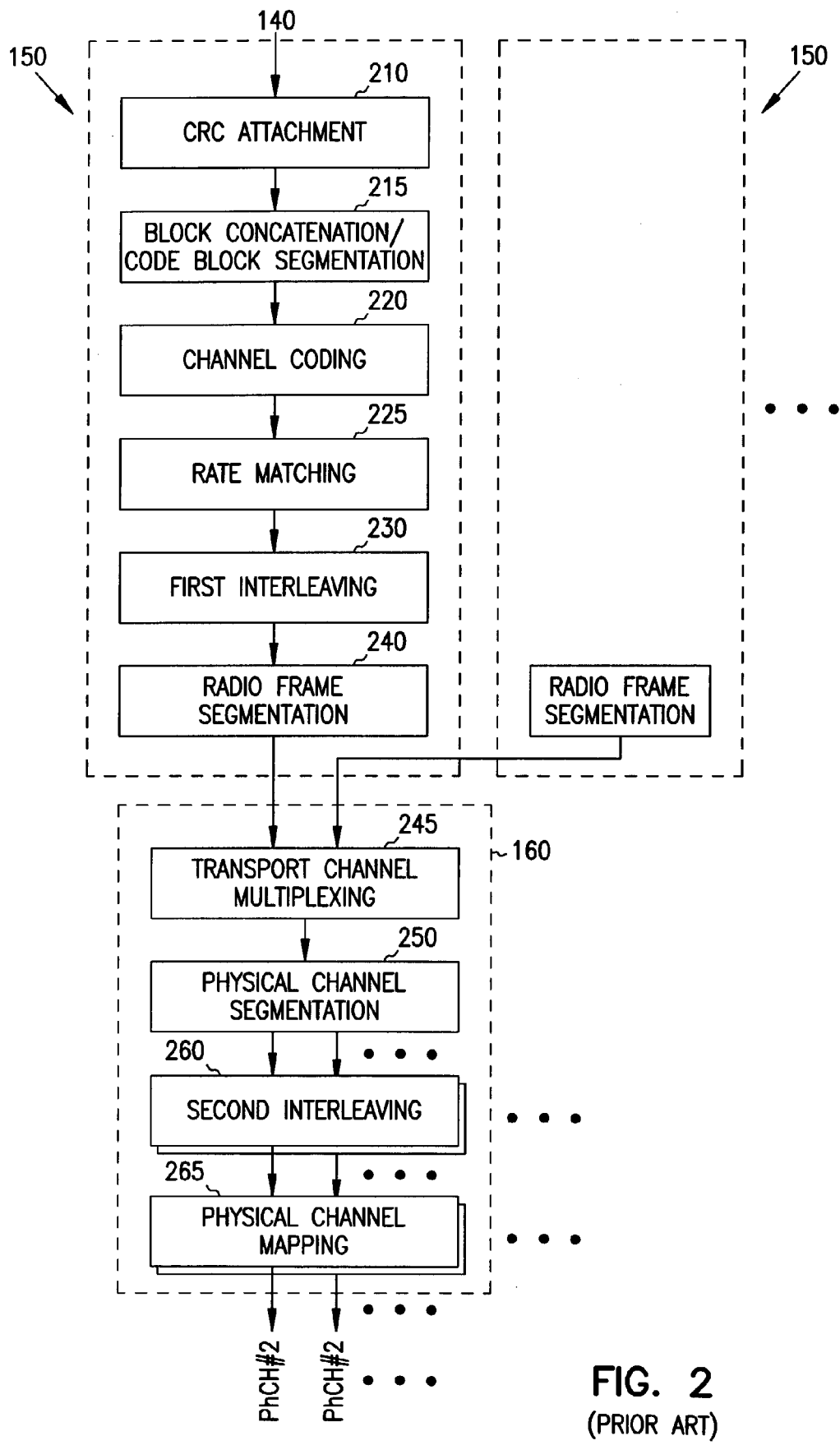
FIG. 2 is a block diagram including major components of the prior art 3GPP physical layer transmitter shown in FIG. 1.

FIG. 2 is a block diagram 200 showing major components of the prior-art 3GPP physical layer transmitter 100 shown in FIG. 1. Shown in FIG. 2 are transport channels 140, physical layer 150 coupled to the transport channels 140, and physical channel(s) 160 coupled to the physical layer 150. As shown in FIG. 2, the physical layer 150 includes a CRC attachment module 210, a block concatenation/Code block segmentation module 215, a channel coding module 220, a rate matching module 225, a first interleaving module 230, and a radio frame segmentation module 240 associated with each of the transport channels 140. Also shown in FIG. 2 is the physical channel 160 including the transport channel multiplexing module 245, physical channel segmentation module 250, second interleaving module 260, and a physical channel mapping 265.

In operation, the transport channels 140 receive a data stream from MAC 130 and gives it to the physical layer 150 every TTI seconds. As explained in detail above, TTI can be 10, 20, 40, or 80 milliseconds. FIG. 2 shows different functions performed on the received data stream before it is spread, modulated, and transmitted to a receiver through the physical channels 160.

First, a CRC computation is performed on the received data by the CRC attachment module for each of the data blocks to be transmitted. These blocks are then encoded (turbo/convolution coding) using the block concatenation/code block segmentation modules 215 and 220, respectively. Data blocks are then rate matched. by puncturing or repetition of certain bits to meet the required data rate. Rate matched data blocks are then interleaved using first interleaving module 230, and further segmented to split the interleaved data blocks to 10 millisecond radio frames using the radio frame segmentation module 240.

First interleaving module 230 is a block interleaver, which consists of two stage operations. In the first stage, the input data sequence is written into a rectangular matrix row by row. In the second stage, the order of the written rectangular matrix including the row-by-row data sequence is permuted. The permuting in the second stage includes inter-column permutation. The following example illustrates the two-stage operation of the first interleaving module 230.

If the size of the rate matched data block is 54 bits after rate matching by the rate matching module 225, TTI being equal to 40 milliseconds, then the number of columns 'C' for the received rate matched data block of 54 bits is determined using the following illustrated table.

| Interleaving span (TTI) | Column number 'C' | Inter-column permutation patterns |
|---|---|---|
| 10 ms | 1 | {0} |
| 20 ms | 2 | {0,1} |
| 40 ms | 4 | {0,2,1,3} |
| 80 ms | 8 | {0,4,2,6,1,5,3,7} |

Using the above table the number of columns 'C' for a TTI of 40 milliseconds is 4. Then the number of rows 'R' is computed by finding a minimum integer R using the equation:

$K <= R \times C$, wherein 'K' is the number of bits in the rate matched data block.

Using the above equation yields a value of 14 for 'R.'

If the rate matched data bits in the received rate matched data block including 54 bits of data are indexed as $X_0$, $X_1$, $X_2$, ... $X_{53}$, then the input data sequence for the first interleaving will be written in the R×C rectangular matrix row by row as shown in the table below. Shaded parts in the following Table 1 correspond to the uninitialised elements. There are no data bits in the shaded parts of the last row because (R×C) is greater than K, that is 56−54=2.

TABLE 1

| $X_0$ | $X_1$ | $X_2$ | $X_3$ |
|---|---|---|---|
| $X_4$ | $X_5$ | $X_6$ | $X_7$ |
| $X_8$ | | | |
| | | | |
| | | | |
| | | | |
| | | | |
| | | | |
| | | | |
| | | | |
| | | | |
| | | | |
| $X_{48}$ | $X_{49}$ | $X_{50}$ | $X_{51}$ |
| $X_{52}$ | $X_{53}$ | | |

The second stage then includes the inter-column permutation based on a pattern, which depends on TTI. This includes performing the inter-column permutation based on the pattern {P (j)}(j=0, 1 . . . C−1) that is shown in the above-illustrated table where P (j) is the original column position of the j-th permuted column. The output of the 1$^{st}$ interleaving is then sequence read out column-by-column from the inter-column permuted R×C matrix and the output is pruned by deleting the non-existing bits in the input sequence, where the deleting a number of bits 1 is defined as:

$1 = (R \times C) - K$

The following Table 2 illustrates the data matrix in the above table after interleaving.

TABLE 2

| $X_0$ | $X_2$ | $X_1$ | $X_3$ |
|---|---|---|---|
| $X_4$ | $X_6$ | $X_5$ | $X_7$ |
| $X_8$ | | | |
| | | | |
| | | | |
| | | | |
| | | | |
| | | | |
| | | | |
| | | | |
| | | | |
| | | | |
| | | | |
| $X_{48}$ | $X_{50}$ | $X_{49}$ | $X_{51}$ |
| $X_{52}$ | | $X_{53}$ | |

Valid data bits are read out column by column from Table 1, and the data bits after interleaving is $X_0, X_4, X_8 \ldots X_{52}, X_2, X_6, X_{10} \ldots X_{50}, X_1, X_5, X_9 \ldots X_{53}, X_3, X_7, X_{11} \ldots X_{51}$ as illustrated in above table 1. Note that the last elements in $2^{nd}$ and $4^{th}$ column of Table 2 are not valid data bits and hence are not read.

Thought the data blocks are given to the physical layer 150 every TTI, physical layer 150 has to transmit data every 10 milliseconds. Each transport channel with a TTI of 10, 20,40, or 80 milliseconds is segmented into 10 milliseconds equi-sized data blocks. Those segmented TTI/10 blocks (1, 2, 4, or 8) are output to the physical channel(s) 160 for multiplexing in block-wise order every 10 milliseconds.

As mentioned above, if K is the number of bits in the interleaved data block, and if K is not exactly divisible by T, where T ('T' is equal to TTI/10) is the number of segmented blocks (1, 2, 4, or 8), then filler bits need to be added to the interleaved data block. This process is referred to as 'radio frame equalization.' The number of extra bits added, also called filler bits is equal to $r=(L\times T)-K$, where L is the number of bits per segmented radio block corresponding to a 10 millisecond frame. The interleaved data stream is segmented into T data blocks such that, the first (T−r) data blocks have L bits of data and the last r data blocks have (L−1) bits of data and one filler bit.

Figure 3:
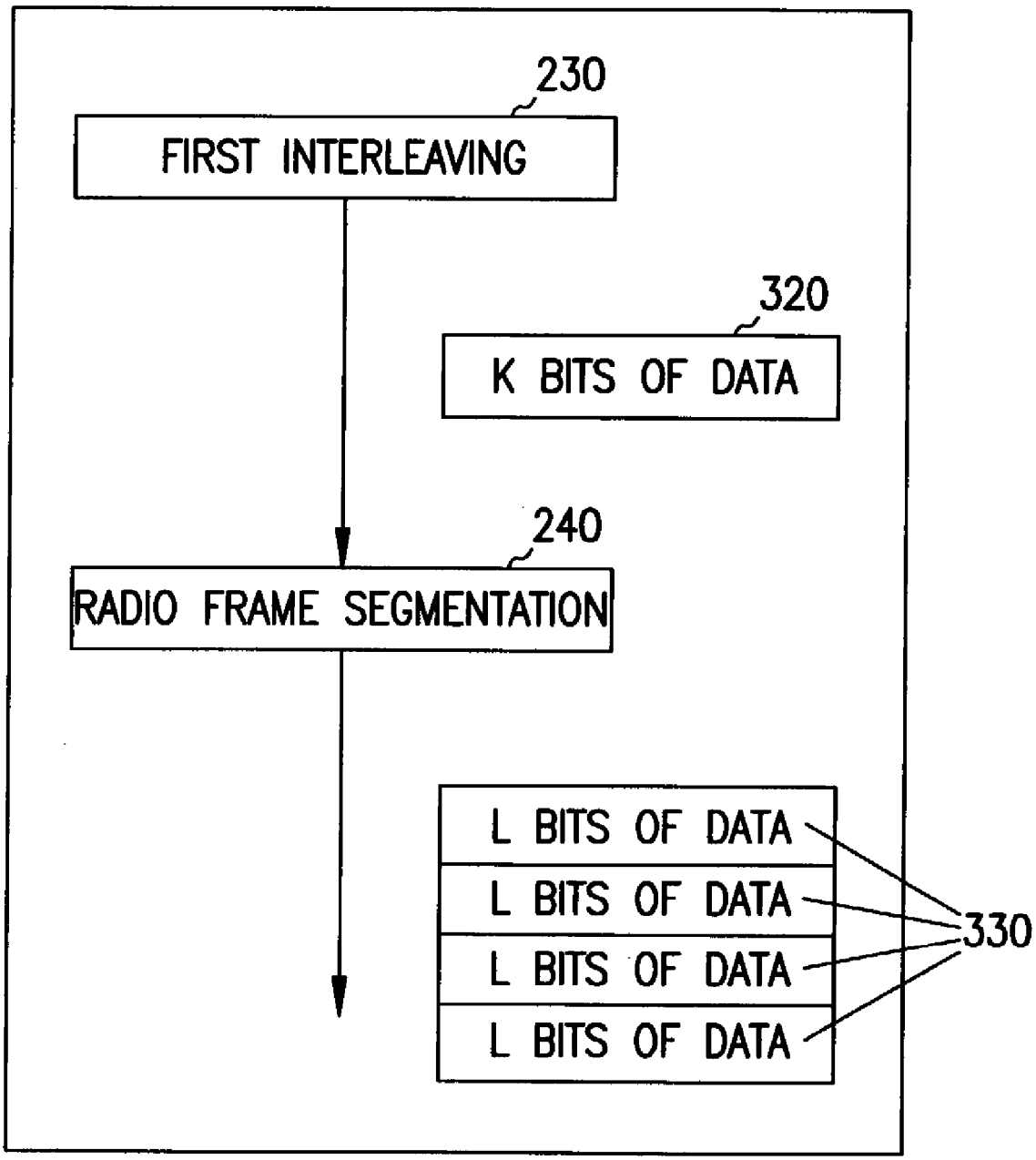
FIG. 3 is a block diagram illustrating the functioning of a prior art first interleaver and radio frame segmentation blocks of the 3GPP physical layer shown in FIG. 2.

FIG. 3 illustrates the functioning of first interleaver and radio frame segmentation blocks of the prior-art 3GPP physical layer shown in FIG. 2. As shown in FIG. 3, the first interleaving module 230 receives K bits of rate matched data block and outputs permuted K bits of rate matched data block 320. Then the Radio frame segmentation module 240 receives the permuted K bits of data block 320 and segments them into 10 milliseconds equi-sized data blocks 330. In the example embodiment shown in FIG. 3, there are 4 blocks (TTI=40 milliseconds) including L bits of data in each block corresponding to 10 millisecond frame.

The output data stream of the interleaver in the above illustration is $X_0, X_4, X_8 \ldots X_{52}, X_1, X_6, X_{10} \ldots X_{50}, X_2, X_5, X_9 \ldots X_{53}, X_3, X_7, X_{11} \ldots X_{51}$. This stream of data is segmented into data blocks of 10-millisecond radio frames and is further equalized using the radio frame segmentation module 240 as illustrated below.

In Table 2 the permuted data blocks K=54 and T=4, $r=(L\times T)-K=2$, where L is the smallest integer which satisfies, K<=L×T, L=14, and K, T, r and L have the same meaning as described above.

Since the input block size illustrated in Table 2 is 2 bits short, the first two segmented data blocks will have 14 bits of data, whereas the last two will have 13 bits of data and one filler bit is added in each of the last two segmented data blocks as illustrated below.

Hence the output of radio frame segmentation module 240 will be—

Radio frame #1: $X_0, X_4, X_8 \ldots X_{48}, X_{52}$
Radio frame #2: $X_2, X_6, X_{10} \ldots X_{50}, X_1$
Radio frame #3: $X_5, X_9, X_{13} \ldots X_{53},$ f
Radio frame #4: $X_3, X_7, X_{11} \ldots X_5,$ f
where 'f' is the filler bit.

In the prior-art technique described above, the data stream is divided into TTI/10 columns in the first interleaving and then a single stream is formed by reading column wise. Again during radio frame segmentation, data is divided into TTI/10 radio segments. Also, during first interleaving, a decision has to be made to avoid invalid data bits, and again filler bits are inserted during segmentation. Thus, it can be seen that the same operations are done twice without any gain. Also, it can be seen that repeating the operation twice results in consuming additional processing power.

As shown in FIG. 2, radio frames from different transport channels 140 are then multiplexed using the transport channel multiplexing nodule 245. The multiplexed radio frames are then second level interleaved using the physical channel segmentation module 250 and the second interleaving module 260, and then mapped and outputted to the associated physical channels 160 along with pilot and power control bits using the physical channel mapping module 265.

Figure 4:
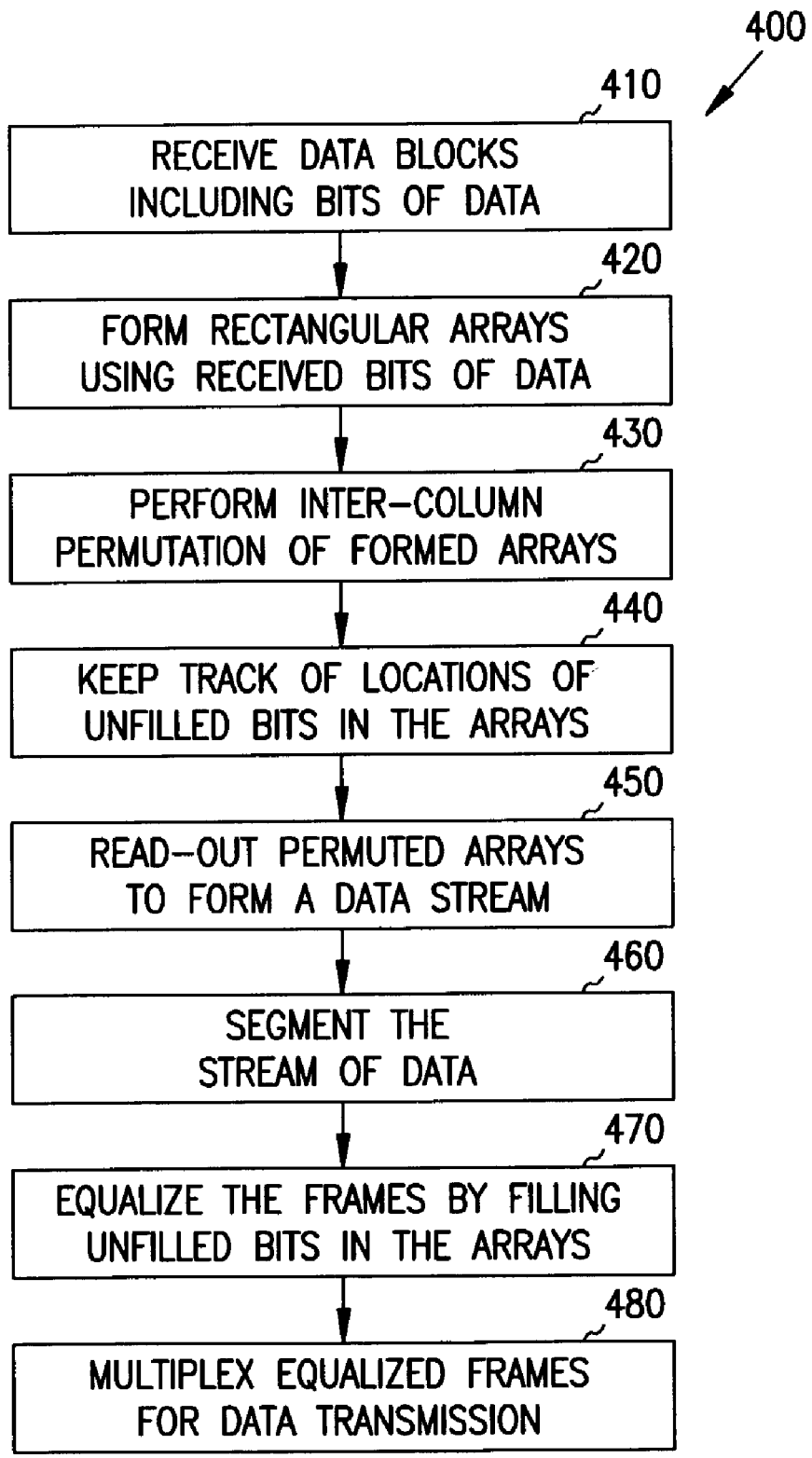
FIG. 4 is a flowchart illustrating the operation of radio frame equalization, interleaving, and frame segmentation of the prior-art 3GPP physical layer shown in FIG. 2.

FIG. 4 is a flowchart illustrating a prior art process 400 of radio frame equalization, interleaving, and frame segmentation The process begins with stop 410 by receiving data blocks including bits of data. Step 420 includes forming rectangular arrays using the received bits of data. Step 430 includes performing inter-column permutation of formed arrays. Step 440 includes keeping track of locations of unfilled bits in the arrays. Step 450 includes reading-out permuted arrays to form a data stream. Step 460 includes segmenting the read-out stream of data to form frames. Step 470 includes equalizing the frames by filling unfilled bits in the arrays. Step 480 includes multiplexing equalized frames for data transmission. It can be seen that the steps 440, 450, 460, and 470 in the above-described prior art process 400 can be combined into one operation to reduce complexity in coding and interleaving schemes.

Figure 5:
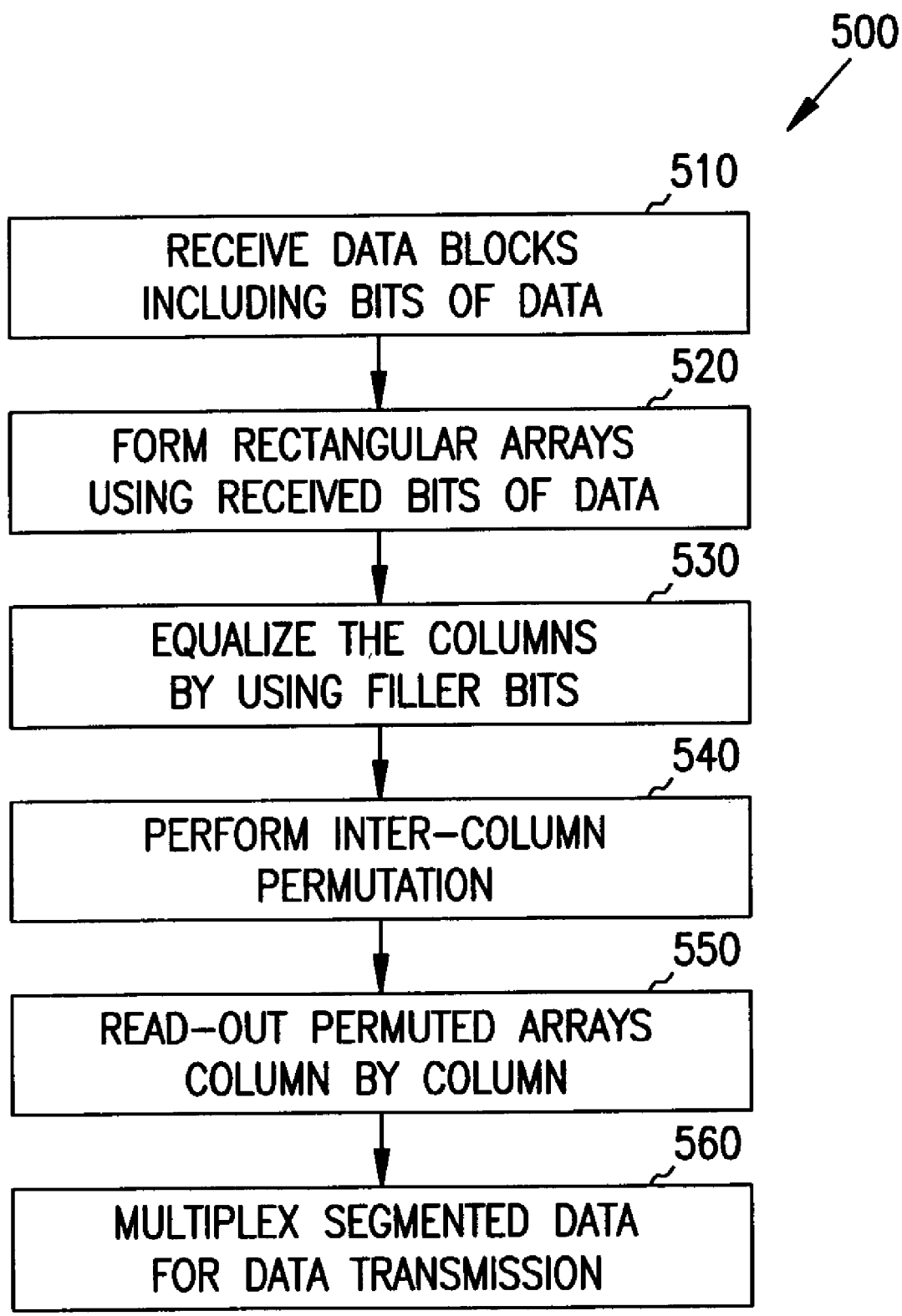
FIG. 5 is a flowchart illustrating an example embodiment of the operation of the combined radio frame equalization, interleaving, and frame segmentation block of the present invention.

FIG. 5 is a flowchart illustrating one example embodiment of a process 500 of processing data blocks including bits of data coming from multiple transport channels in a transmitter of a radio communication system supporting variable data-rate transmissions. The process 500 illustrated in FIG. 5 combines radio frame equalization, interleaving, and frame segmentation block to reduce complexity in coding and interleaving schemes in the prior art process. The process beings with step 510 by receiving data blocks including the bits of data within a Transport Time Interval associated with each of the multiple transport channels. The Transport Time Interval can be 10, 20, 40, and/or 80 milliseconds. In other embodiments, the Transport Time Interval includes one or more segmented radio frames. In these embodiments, the one or more frames have a time interval of 10 milliseconds.

Step 520 includes forming rectangular arrays including a predetermined number of columns and arrays for each of the received data blocks by filling elements in the formed arrays with the bits of data associated with each of the data blocks. Further, the predetermined number of columns is formed based on Transport Time Interval suitable for the variable data-rate transmissions. In other embodiments, the number of rows is dependent on the number of columns and the radio frame size. In some embodiments, forming the rectangular arrays includes selecting the predetermined number of columns using a look up table based on the Transport Time Interval associated with each of the multiple transport channels. Then computing the predetermined number of rows finding a minimum integer R such that K<=R×C, where R is the predetermined number of rows, K is the number of data bits in the data blocks, and C is the selected predetermined number of columns.

Step 530 includes equalizing the columns in each of the arrays by adding filler bits to unfilled elements in the arrays. Step 540 includes performing inter-column permutation for each of the formed arrays based on a look up table. In some embodiments, performing the inter-column permutation includes performing the inter-column permutation for each of the formed arrays using a look up table based on the Transport Time Interval associated with each of the multiple transport channels.

Step 550 includes reading-out column-by-column bits of data from each of the equalized columns in the arrays. In some embodiments, the read columns correspond to the predetermined time interval of 10 milliseconds. Step 560 includes multiplexing the read-out bits of data for the variable data-rate transmissions.

Figure 6:
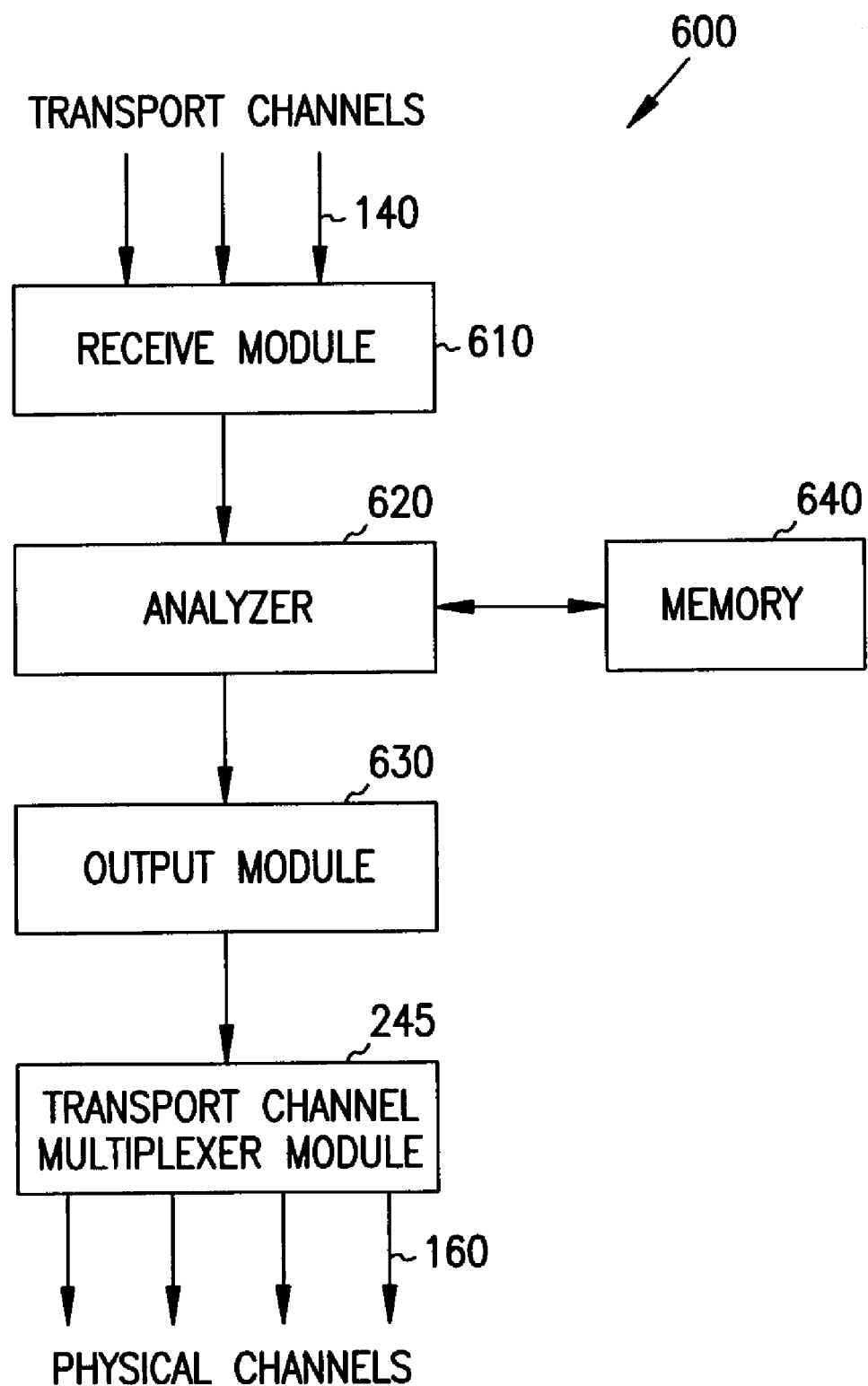
FIG. 6 is a block diagram illustrating major components of the computer-implemented system of the embodiment shown in FIG. 5.

FIG. 6 is a block diagram 600 of a transmitter according to the teachings of the present invention. Shown in FIG. 6 are receive module 610, analyzer 620, output module 630, memory 640, and transport channel multiplexer 245.

In operation, the receive module 610 receives data blocks including bits of data within a Transport Time Interval associated with each of the multiple transport channels. The analyzer 620 coupled to the receive module 610 then forms rectangular arrays including a predetermined number of columns and arrays for each of the received data blocks by filling elements in the formed arrays with the bits of data associated with each of the data blocks. The predetermined number of columns is based on Transport Time Interval suitable for the variable data-rate transmissions. The analyzer 620 then equalizes the columns in each of the arrays by adding filler bits to unfilled elements in the arrays and then performs inter-column permutation for each of the formed arrays based on a look up table. The output module 630 coupled to the analyzer 620 then reads out bits of data from each of the equalized columns in the arrays column-by-column and outputs the read bits of data The transport channel multiplexer module 245 then receives the bits of data from the output module 630 and multiplexes the bits of data for variable data-rate transmissions.

The method 500 shown in FIG. 5 may be implemented as an input module 610, an analyzer 620, an output module 630, a memory 640, and a transport channel multiplexer module 245, as shown in FIG. 6. Various aspects of the present invention are implemented in software, which may be run in the environment shown in FIG. 7 or any other suitable computing environment. The present invention is operable in a number of other general purpose or special purpose computing environments. Some computing environments are personal computers, general-purpose computers server computers, hand held devices, laptop devices, multiprocessors, microprocessors, set top boxes, programmable consumer electronics, network PCs, minicomputers, mainframe computers, distributed computing environments and the like to execute the code, which is stored on a computer readable medium. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

Figure 7:
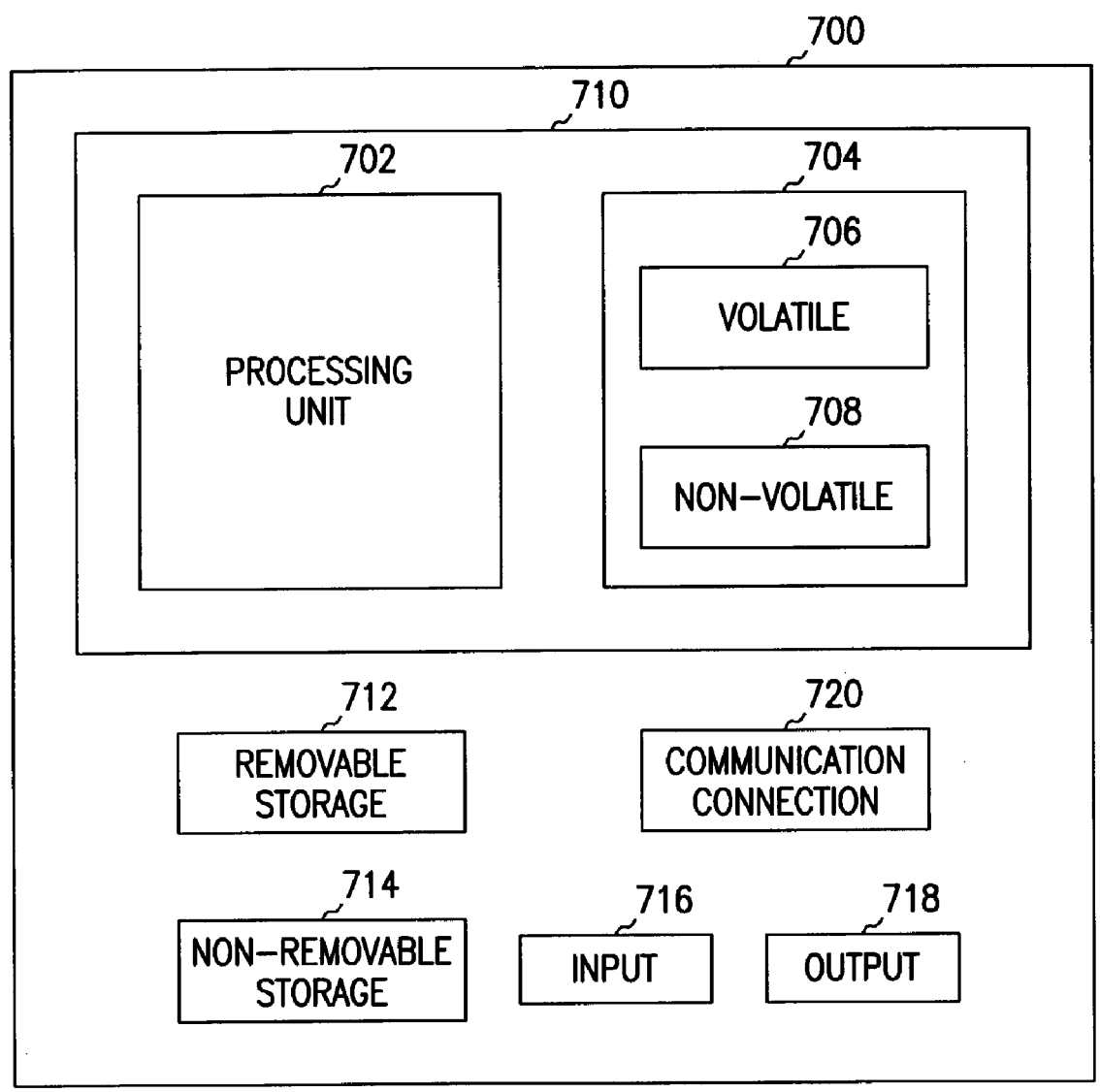
FIG. 7 is a block diagram of a suitable computing system environment for implementing embodiments of the present invention, such as those shown in FIGS. 5, and 6.

FIG. 7 shows an example of a suitable computing system environment 700 for implementing embodiments of the present invention, such as those shown in FIGS. 5 and 6. Various aspects of the present invention are implemented in software, which may be run in the environment shown in FIG. 7 or any other suitable computing environment. The present invention is operable in a number of other general purpose or special purpose computing environments. Some computing environments are personal computers, server computers, hand-held devices, laptop devices, multiprocessors, microprocessors, set top boxes, programmable consumer electronics, network PCs, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

FIG. 7 shows a general computing device in the form of a computer 710, which may include a processing unit 702, memory 704, removable storage 712, and non-removable storage 714. The memory 704 may include volatile 706 and non-volatile memory 708. Computer 710 may include—or have access to a computing environment that includes—a variety of computer-readable media, such as volatile 706 and non-volatile memory 708, removable 712 and non-removable storage 714. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

CONCLUSION

The above-described invention provides a technique for reducing complexity in coding and interleaving schemes in the physical layer and processing power requirements without degradation in performance in 3G wireless systems.

The above description is intended to be illustrative, and not restrictive. Many other embodiments will be apparent to those skilled in the art. The scope of the invention should therefore be determined by the appended claims, along with the full scope of equivalents to which such claims are entitled.

The invention claimed is:

1. A computer implemented method for processing data blocks including bits of data coming from multiple transport channels in a transmitter of a radio communication system supporting variable data-rate transmissions, comprising:
   receiving the data blocks including the bits of data within a Transport Time Interval associated with each of the multiple transport channels;
   forming rectangular arrays in computer memory including a predetermined number of columns and arrays for each of the received data blocks by filling elements in the formed arrays with the bits of data associated with each of the data blocks, wherein each of the predetermined number of columns is based on Transport Time Interval suitable for the variable data-rate transmissions;
   equalizing the columns in each of the arrays by adding filler bits to unfilled elements in the formed arrays;
   performing inter-column permutation for each of the equalized columns in the arrays based on a look up table; and
   reading-out bits of data in the computer memory from the permuted columns in the arrays column-by-column into radio frames without first forming a bit sequence and segmenting the bit sequence, wherein there is a one to one mapping between a column and a radio frame.

2. The method of claim 1, wherein the Transport Time Interval is a time interval selected from the group consisting of 10, 20, 40, and 80 milliseconds.

3. The method of claim 1, wherein forming the rectangular arrays including the predetermined number of columns and arrays for each of the received data blocks further comprises:
   selecting the predetermined number of columns using a look up table based on the Transport Time Interval associated with each of the multiple transport channels; and
   computing the predetermined number of rows finding a minimum integer R such that $K<=+R \times C$, where R is the predetermined number of rows, K is the number of data bits in the data blocks, and C is the selected predetermined number of columns.

4. The method of claim 3, wherein performing the inter-column permutation comprises:
   performing the inter-column permutation for each of the formed arrays using a look up table based on a Transport The Interval associated with each of the multiple transport channels.

5. The method of claim 4, wherein each of the read columns corresponds to the predetermined time interval of 10 milliseconds.

6. The method of claim 1, wherein the Transport Time Interval includes one or more segmented radio frames.

7. The method of claim 6, wherein each of the one or more frames has a time interval of 10 milliseconds.

8. A computer readable medium having computer-executable instructions for an improved method of processing data blocks including bits of data coming from multiple transport channels in a transmitter of a radio communication system supporting variable data-rate transmission, comprising:
   receiving the data blocks including the bits of data within a Transport Time Interval associated with each of the multiple transport channels;
   forming rectangular arrays including a predetermined number of columns and arrays for each of the received data blocks by filling elements in the formed arrays with the bits of data associated with each of the data blocks, wherein each of the predetermined number of columns is based on Transport Time h Interval suitable for the variable data-rate transmissions;
   equalizing the columns in each of the arrays by adding filler bits to unfilled elements in the arrays;
   performing inter-column permutation for each of the equalized columns in the arrays based on a look up; and
   reading bits of data from the permuted columns in the arrays column-by-column into radio frames without first forming a bit sequence and segmenting the bit sequence, wherein there is a one to one mapping between a column and a radio frame.

9. The computer readable medium of claim 8, wherein the Transport Time Interval is a time interval selected from the group consisting of 10, 20, 40, and 80 milliseconds.

10. The computer readable medium of claim 8, wherein forming the rectangular arrays including the predetermined number of columns and arrays for each of the received data blocks further comprises:
    selecting the predetermined number of columns using a look up table based on the Transport Time Interval associated with each of the multiple transport channels; and
    computing the predetermined number of rows finding a minimum integer R such that $K<=R \times C$, where R is the predetermined number of rows, K is the number of data bits in the data blocks, and C is the selected predetermined number of columns.

11. The computer readable medium of claim 10, wherein performing the inter-column permutation comprises:
    performing the inter-column permutation for each of the formed arrays using a look up table based on the Transport Time Interval associated with each of the multiple transport channels.

12. The computer readable medium of claim 11, wherein each of the read columns corresponds to the predetermined time interval of 10 milliseconds.

13. The computer readable medium of claim 8, wherein the Transport Time Interval includes one or more segmented radio frames.

14. The computer readable medium of claim 13, wherein each of the one or more frames has a time interval of 10 milliseconds.

15. A computer system including data blocks including bits of data coming from multiple transport channels in a transmitter of a radio communication system supporting variable data-rate transmissions, comprising:
    a storage device;
    an output device; and
    a processor configured to:
       receive data blocks including the bits of data within a Transport Time Interval associated with each of the multiple transport channels;
       form rectangular arrays including a predetermined number of columns and arrays for each of the received data blocks by filling elements in the formed arrays with the bits of data associated with each of the data blocks, wherein each of the predetermined number of columns is based on Transport Time Interval suitable for the variable data-rate transmissions;

equalize the columns in each of the arrays by adding filler bits to unfilled elements in the arrays;

perform inter-column permutation on the equalized columns in the formed arrays based on a look up table; and read-out bits of data from the equalized columns in the arrays column-by-column into radio frames without first forming a bit sequence and segmenting the bit sequence, wherein there is a one to one mapping between a column and a radio frame.

16. The system of claim 15, wherein the Transport Time Interval is a time interval selected from the group consisting of 10, 20, 40, and 80 milliseconds.

17. The system of claim 15, wherein in the formation of the rectangular arrays including the predetermined number of columns and arrays for each of the received data blocks the processor is further configured to:

select the predetermined number of columns using a look up table based on the Transport Time Intervals associated with each of the multiple transport channels; and compute the predetermined number of rows finding a minimum integer R such that $K<=R \times C$, when R is the predetermined number of rows, K is the number of data bits in the data blocks, and C is the selected predetermined number of columns.

18. The system of claim 17, wherein the performance of the inter-column permutation the processor is further configured to:

perform the inter-column permutation for each of the formed ways using a look up table based on Transport Time Interval associated with each of the multiple transport channels.

19. The system of claim 18, wherein each of the read columns corresponds to the predetermined time interval of 10 milliseconds.

20. The system of claim 15, wherein the Transport Time Interval includes one or more segmented radio frames.

21. The system of claim 20, wherein each of the one or more frames has a time interval of 10 milliseconds.

22. A transmitter for processing data blocks including bits of data coming from multiple transport channels in a transmitter of a radio communication system supporting variable data-rate transmissions, comprising:

a receive module to receive the data blocks including the bits of data within a Transport Time interval associated with each of the multiple transport channels;

an analyzer coupled to the receive module to receive the data blocks and form rectangular arrays including a predetermined number of columns and arrays for each of the received data blocks by filling elements in the formed arrays with the bits of data associated with each of the data blocks, wherein the analyzer equalizes the columns in each of the arrays by adding filler bits to unfilled elements in the formed arrays, wherein the analyzer further performs inter-column permutations for each of the formed arrays based on a look up table; and an output module coupled to the analyzer to receive the permuted arrays and read-out bits of data from the permuted arrays column-by-column into radio frames without first forming a bit sequence and segmenting the bit sequence, wherein there is a one to one mapping between a column and a radio frame.

23. The transmitter of claim 22, further comprising:
a memory to store the look up table.

24. The transmitter of claim 22, wherein the predetermined number of columns is based on Transport Time Interval suitable for the variable data rate transmission.

25. The transmitter of claim 22, wherein the Transport Time Interval is a time interval selected from the group consisting of 10, 20, 40, and 80 milliseconds.

26. The transmitter of claim 22, wherein the analyzer forms the rectangular arrays by selecting the predetermined number of columns using a look up table based on a Transport Time Interval associated with each of the multiple transport channels and by computing the predetermined number of rows finding a minimum integer R such that $K<=R \times C$, where R is the predetermined number of rows, K is the number of data bits in the data blocks, and C is the selected predetermined number of columns.

27. The transmitter of claim 26, wherein the analyzer performs inter-column permutation for each of the formed arrays using a look up table based on a Transport Time Interval associated with each of the multiple transport channels.

28. The transmitter of claim 27, wherein each of the read columns corresponds to the predetermined time interval of 10 milliseconds.

29. The transmitter of claim 22, wherein the Transport Time Interval includes one or more segmented radio frames.

30. The transmitter of claim 29, wherein each of the one or more frames has a time interval of 10 milliseconds.

31. A computer implemented method for processing data blocks coming from multiple transport channels in a transmitter of a radio communication system, comprising:

receiving the data blocks including bits of data within a Transport Time Interval associated with each of the multiple import channels;

forming rectangular arrays in computer memory including a predetermined number of columns and arrays for each of the received data blocks by filling elements in the formed arrays with the bits of data associated with each of the data blocks, wherein each of the predetermined number of columns is based on segmented radio frame sizes suitable for variable data-rate transmissions;

equalizing the columns in each of the arrays by adding filler bits to unfilled elements in the formed arrays;

performing inter-column permutation for each of the equalized columns in the arrays; and reading-out bits of data in the computer memory from of the permuted columns in the arrays column-by-column into radio frames without first forming a bit sequence and segmenting the bit sequence, wherein there is a one to one mapping between a column and a radio frame.

32. The method of claim 31, wherein segmented radio frame sizes suitable for the variable data-rate transmission comprises:

Transport Time Interval suitable for the variable data-rate transmissions.

33. The method of claim 32, wherein performing the inter-column permutation comprises:

performing the inter-column permutation for each of the equalized columns in the arrays based on a look up table.

34. The method of claim 33, wherein the look up table is based on a Transport Time Interval associated with each of the multiple transport channels.

35. The method of claim 32, wherein multiplexing the data from the permuted columns further comprises:
- reading-out bits of data from each of the permuted columns in the arrays column-by-column; and
- multiplexing the read-out bits of data for the variable data-rate transmissions.

36. The transmitter of claim 35, wherein each of the read columns corresponds to the predetermined time interval of 10 milliseconds.

* * * * *

UNITED STATES PATENT AND TRADEMARK OFFICE
CERTIFICATE OF CORRECTION

PATENT NO. : 7,310,324 B2
APPLICATION NO. : 10/374889
DATED : December 18, 2007
INVENTOR(S) : T. Kiran It is certified that error appears in the above-identified patent and that said Letters Patent is hereby corrected as shown below:

In column 11, line 10, in Claim 1, delete "computer implemented" and insert -- computer-implemented --, therefor.

In column 11, line 48, in Claim 3, delete "K<=+R×C," and insert -- K<=R×C, --, therefor.

In column 11, line 56, in Claim 4, before "Interval" delete "The" and insert -- Time --, therefor.

In column 12, line 11, in Claim 8, before "Interval" delete "h".

In column 13, line 22, in Claim 17, delete "Intervals" and insert -- Interval --, therefor.

In column 13, line 49, in Claim 22, delete "interval" and insert -- Interval --, therefor.

In column 14, line 14, in Claim 26, after "by" insert -- further --.

In column 14, line 31, in Claim 31, delete "computer implemented" and insert -- computer-implemented --, therefor.

In column 14, line 50, in Claim 31, after "from" delete "of".

Signed and Sealed this

Eighth Day of December, 2009

David J. Kappos
*Director of the United States Patent and Trademark Office*